United States Patent
Cooley

(10) Patent No.: US 11,332,361 B2
(45) Date of Patent: May 17, 2022

(54) FULLY-INTEGRATED, TOP-FILL, PRESSURELESS FLOW-CONTROL MODULE COUPLABLE TO A PRESSURIZED FUEL LINE

(71) Applicant: Dean Edward Mackey, Springvillw, UT (US)

(72) Inventor: Robert Charles Cooley, Springville, UT (US)

( * ) Notice: Subject to any disclaimer, the term of this patent is extended or adjusted under 35 U.S.C. 154(b) by 948 days.

(21) Appl. No.: 16/077,474

(22) PCT Filed: Feb. 13, 2017

(86) PCT No.: PCT/US2017/017742
§ 371 (c)(1),
(2) Date: Aug. 11, 2018

(87) PCT Pub. No.: WO2017/139806
PCT Pub. Date: Aug. 17, 2017

(65) Prior Publication Data
US 2021/0198094 A1 Jul. 1, 2021

Related U.S. Application Data

(60) Provisional application No. 62/293,775, filed on Feb. 11, 2016.

(51) Int. Cl.
*F16K 31/22* (2006.01)
*F16K 31/26* (2006.01)
(Continued)

(52) U.S. Cl.
CPC ............... *B67D 7/46* (2013.01); *B67D 7/367* (2013.01); *F16K 31/22* (2013.01); *F16K 31/26* (2013.01);
(Continued)

(58) Field of Classification Search
CPC ..................... B67D 7/46; B67D 7/367; B67D 2015/03289; F16K 31/26; F16K 31/34;
(Continued)

(56) References Cited

U.S. PATENT DOCUMENTS 226,224 A * 4/1880 Demarest ................ F16K 31/34
137/413
2,767,551 A 10/1956 Clute
(Continued)

FOREIGN PATENT DOCUMENTS

JP WO/2012/124410 9/2012

*Primary Examiner* — Hailey K. Do
(74) *Attorney, Agent, or Firm* — Angus C. Fox, III

(57) ABSTRACT

A fully-integrated, flow-control module for top-fill fuel tanks is designed to operate with a fuel line attached that supplies fuel under constant pressure. A main flow control valve within the flow-control module closes automatically when the fuel tank is full, and automatically opens when the fuel level drops a certain amount below the full level. A spring-biased valve plunger of the main flow control valve has a bleed aperture that diverts a small amount of incoming fuel to a bleed path that is controlled by a fuel level float that operates on a lever arm that either opens or closes the bleed path. When closed, fuel pressure beneath the valve plunger increases sufficiently that the plunger biasing spring is able to exert a force sufficient to close the valve plunger. Bleed path control hysteresis prevents rapid cycling of the main flow control valve.

10 Claims, 8 Drawing Sheets

(51) Int. Cl.
  *F16K 31/34* (2006.01)
  *B67D 7/46* (2010.01)
  *B67D 7/36* (2010.01)
  *B60K 15/03* (2006.01)

(52) U.S. Cl.
  CPC .... *F16K 31/34* (2013.01); *B60K 2015/03289* (2013.01)

(58) Field of Classification Search
  CPC ..... F16K 21/18; G05D 9/02; Y10T 137/7371; Y10T 137/7433; Y10T 137/7462
  See application file for complete search history.

(56) References Cited

U.S. PATENT DOCUMENTS

| | | | |
|---|---|---|---|
| 3,929,155 A | | 12/1975 | Garretson |
| 6,311,723 B1 | | 11/2001 | Shipp et al. |
| 6,408,869 B1 | * | 6/2002 | Bartos ................. F16K 1/303 137/414 |
| 6,450,196 B1 | * | 9/2002 | Bartos ................. F16K 31/34 137/414 |
| 6,640,829 B1 | * | 11/2003 | Kerger ................. F16K 1/305 137/413 |
| 7,273,205 B2 | * | 9/2007 | Dalmasso .............. F16K 24/06 251/28 |
| 9,983,598 B2 | | 5/2018 | Cooley |
| 2002/0000248 A1 | * | 1/2002 | Herlihy ................ F16K 31/385 137/413 |

\* cited by examiner

FULLY-INTEGRATED, TOP-FILL, PRESSURELESS FLOW-CONTROL MODULE COUPLABLE TO A PRESSURIZED FUEL LINE

RELATED APPLICATION DATA

This application has a priority date based on the filing of U.S. Provisional Application No. 62/293,775 on Feb. 11, 2016 and the filing of International Application No. PCT/US17/17742 on Feb. 13, 2017.

BACKGROUND OF THE INVENTION

Field of the Invention

This invention relates, generally, to valve assemblies and, more particularly, to flow control valve assemblies that are used to protect primarily fuel tanks from being overfilled with fuel. However, it is likely that such flow control valve assemblies may be used to protect other types of containers, other than fuel tanks, from being overfilled with other kinds of fluids.

Description of the Prior Art

For many years large machinery fitted with fuel tanks have been equipped with rapid-fill fueling systems to enable rapid filing of large capacity fuel tanks. The existing fast fill fuel systems rely on an air vent that prevents air from escaping the fuel tank when the required level of fuel has been attained. This causes pressure in the fuel tank to increase to a level that automatic shuts-off a fuel supply nozzle.

A major concern of this system is that when the fuel level activates the shut-off for the fuel supply nozzle, the shut-off can be overridden and fuel can continue to be forced into the fuel tank above the normal level. This can cause the fuel tank to rupture from the high pressure attained when filling.

U.S. Pat. No. 6,311,723, (by the applicant), has addressed this problem by devising a flow control valve assembly that prevents the build up of pressure within the fuel tank during and after filing. The flow control valve assembly also prevents the supply fuel nozzle from being overridden thus preventing the possibility of overfilling. U.S. Pat. No. 6,311,723 is hereby incorporated by reference.

The control valve assembly of U.S. Pat. No. 6,311,723 uses float valve to determine when the level of fuel in the fuel tank is at a desired level. When the desired level of fuel has been attained, the float valve is used to block the flow of fuel through a bleed pipe to stop the flow of fuel through a control valve. An open breather is provided within the fuel tank to allow gas to escape from the fuel tank during filling to prevent the fuel tank rupturing.

Another problem associated with prior-art flow control valves is that they are typically used in bottom-filled tanks. This requires that the float assembly be located inside the tank near the top thereof, while the flow control valve is located near the bottom of the tank near where the fuel nozzle couples to the receiver. In order for the float assembly to control the flow control valve, a small-diameter bleed line is used to couple the flow control valve assembly—that is near the bottom of the tank—to the float assembly that is near the top of the tank. The bleed line can be routed either internal or external to the tank, depending on the design of the unit. The use of such a two-piece assembly precludes the use of such a device in smaller tanks.

What was needed is a fully-integrated flow control assembly that mounts at the top of the fuel tank. In such a fully-integrated unit, the float assembly and the flow control valve assembly are both installed within the tank near the top thereof. Only an inlet/vent head protrudes from the top of the tank. Installing the fully-integrated assembly is much simpler than installing the separate float and control valve assemblies, as there is no need to make a connection between the two devices.

The aforementioned problems were solved, as evidenced by the filing of PCT patent application No. PCT/US2013/000223 titled FULLY-INTEGRATED FLOW-CONTROL VALVE ASSEMBLY FOR TOP-FILLED FUEL TANKS, by the same inventor, on 24 Sep. 2013. This flow-control valve, which is designed for internal mounting near the top of a fuel tank, is suitable for use with liquids, such as petroleum fuels, that do not freeze.

To date, pressureless flow-control modules, whether they be of the top-fill or bottom-fill variety, are not designed to be permanently coupled to a pressurized fuel fill line. Typically, a nozzle is quick-coupled to a flow-control valve assembly on a fuel tank that is at least partly empty. During a filling operation, the fuel level reaches a preset full level and the flow-control valve shuts off, causing the nozzle to also shut off. The nozzle is then removed from the flow-control valve assembly, and not reattached until the tank requires refilling. A need has arisen for a flow-control module used on fuel tanks that are mounted on equipment, such as "fracking" trailers. Such trailers are typically equipped with a hydraulic fracturing pump that is powered by a powerful (i.e., 200+ horsepower) diesel engine. Existing flow-control modules are designed such that they will not open to admit the entry of additional fuel if fuel pressure is maintained on the flow-control module inlet following module shut-off, even if the fuel level in the tank drops below the designed module shut-off level. In order for fuel to reenter the inlet, pressure would, first, need to be cut to zero. This would be impractical, as it is preferable and simpler to maintain constant pressure in the fuel feed lines to the tanks of multiple fracking trailers.

What is needed is a fully-integrated, flow-control valve assembly for top-filled tanks that will switch between on and off states even when the fuel inlet is supplied with fuel under pressure.

SUMMARY OF THE INVENTION

The fully-integrated, flow-control module for top-fill fuel tanks of the present invention is designed to operate with a fuel line attached that supplies fuel under constant pressure. A fuel-flow control valve within the flow-control module closes automatically when the tank is full, and automatically opens when the fuel level drops a certain amount below the full level. The flow-control module has a two-piece inlet/vent head that is connected to a multi-component control valve unit via a vertical connector pipe. The control valve unit has an externally threaded top cap. The top cap also has an internally threaded cylindrical socket that screws onto the connector pipe. The bottom of the top cap has an unthreaded cylindrical socket that is coaxial with the internally threaded cylindrical socket and that receives a top end of a hollow cylindrical float guide. A float, which has a lever arm engagement pin extending from the bottom thereof, slides up and down the float guide, which it surrounds. A bleed path control assembly incorporates a lever arm that is both coupled to the lever arm engagement pin and operative on a vertically-slidable control pin, having a seal on a bottom end thereof, which slides within a cylindrical control pin bore in the bleed path control assembly. The bleed path control assembly also has a bleed pin bore that is below and concentric with the control pin bore. A generally cylindrical, upwardly-biased bleed pin, that has a central bore, slides within the bleed pin bore. A cylindrical float cage having an internally threaded upper end, slides over the bleed path control assembly, over the float, and screws onto the external threaded of the top cap. A bleed pin spring retainer, which retains a bleed pin coil spring that upwardly biases the bleed pin, also slides into the bottom end of the float cage and is secured therein with five set screws. The bleed pin spring retainer also incorporates an upper vertical bleed by passage that is coupled to the chamber in which the bleed pin coil spring is retained via a circular gap between the bottom of the bleed path control assembly and the top of the bleed pin spring retainer. A bottom end of the spring retainer plug is externally threaded, and is threadably coupled to a main valve control unit that incorporates a valve seat, a cylindrical bore for a slidable main valve plunger that can engage the valve seat to cut off flow through the flow-control module, and a lower vertical fuel bleed by passage that is coupled to the upper bleed by passage via a circular groove in the bleed pin spring retainer. The slidable main valve plunger, having a small central bleed aperture, is inserted into the cylindrical bore followed by a coil biasing spring. A bottom plug retains the biasing spring and the main valve plunger in the cylindrical bore. When fuel is flowing into the inlet port under pressure, passing through the connector pipe into the float guide, through the bleed path control assembly, past the valve seat, and escaping into the fuel tank, the main valve plug remains in a lowered position as long as the bleed path that begins with the bleed aperture in the main valve plunger remains open and allows fuel to pass through the bleed pin and out into the fuel tank. However, when the fuel level lifts the float, it also lifts the end of the lever arm, thereby depressing the vertically-slidable control pin, sealing the cylindrical aperture within the bleed pin, and thereby cutting off the fuel bleed path. With the bleed path sealed, the biasing spring plus the added fuel pressure in the chamber below the main valve plunger then have sufficient force to lift the main valve plunger so that it engages the valve seat, thereby cutting off the entry of fuel into the fuel tank.

DETAILED DESCRIPTION OF THE INVENTION

The fully-integrated, flow-control module for top-fill fuel tanks of the present invention will now be described in detail with reference to the included drawing figures. It should be understood that although monochromatic line drawings do not lend themselves to a representation of a multi-component product in exact scale, a serious attempt has been made to portray the product in such a way that its structure and functionality are entirely comprehensible.

Figure 1:
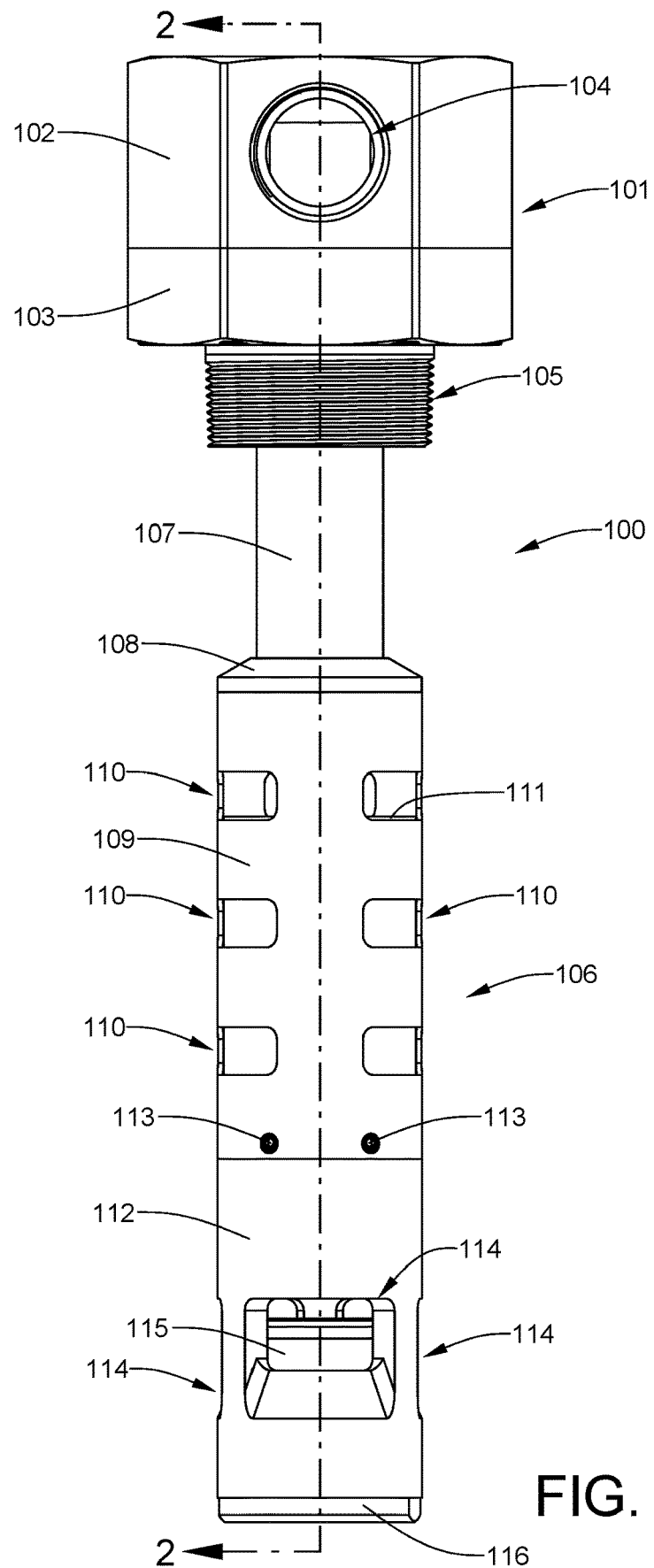
FIG. 1 is an elevational view of the fully-integrated fluid flow control module for top-filled fuel tanks in a valve-open configuration, and taken from the fluid inlet side thereof.

Referring now to FIG. 1, the fully-integrated, flow-control module 100 is seen from the inlet side in an elevational view. Other than the neoprene rubber seals and steel springs, the unit is manufactured preferably from a durable alloy of stainless steel. A hexagonally-shaped inlet/vent head 101 includes an top portion 102 and a bottom portion 103 which are bolted together at the corners of the hexagon. An inlet port 104 in the upper portion 102 is visible in this view, as is a threaded neck 105 on the lower portion 103, which threadably engages an internally threaded port on the top of the fuel tank. The inlet/vent head 101 is threadably coupled to a control valve unit 106 via a connector pipe 107. In this assembled view of the flow-control module 100, primarily the outer components of the control valve unit 106 are visible. The connector pipe 107 screws into a top cap 108, which is threadably connected to a float cage 109 having a plurality of float access ports 110 that allow fuel to flow back and forth between the interior of the fuel tank (not shown) and the interior of the control valve unit 106. The very top of a fuel level float 111 located within the control valve unit 106 can be seen through two of the float access ports 110. A main valve control unit 112 is coupled to the float cage 109. Five set screws 113, two of which are visible in this view, are part of the intercoupling mechanism between the float cage 109 and the main valve control unit 112. There are three fuel escape ports 114 in the main valve control unit 112. A slidable main valve plunger 115 is partly visible through the fuel escape ports 114. A bottom plug 116 traps the valve plunger 115 within the main valve control unit 112.

Figure 2:
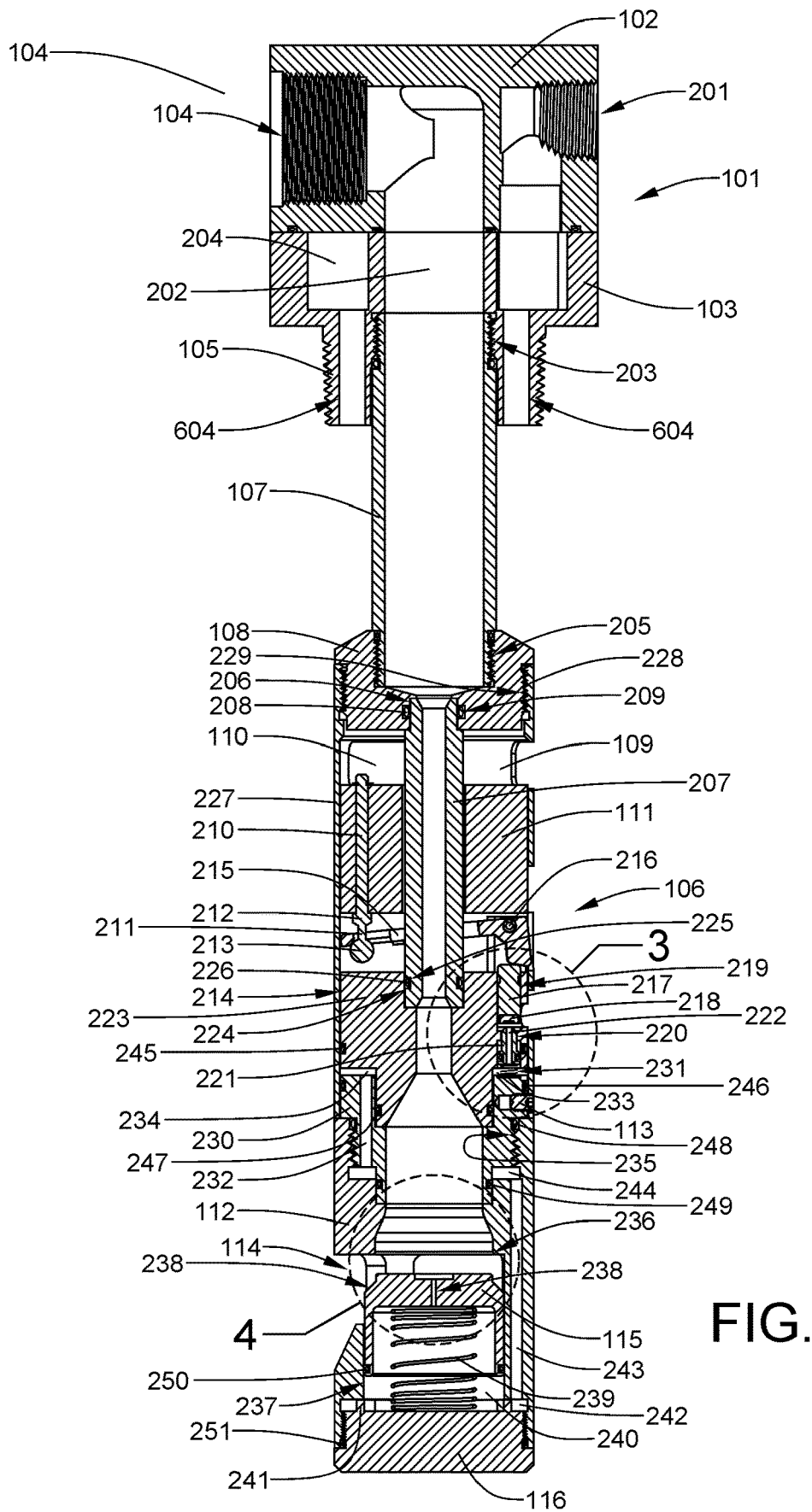
FIG. 2 is a cross-sectional view of the fully-integrated fluid flow control module for top-filled tanks, taken through the section line 2-2 of FIG. 1.

Referring now to FIG. 2, this cross-sectional view of the flow-control module 100 shows the internal structure of both the inlet/vent head 101 and the control valve unit 105. Looking at the inlet/vent head 101, it can be seen that the inlet port 104 is on the left and that it is physically isolated from the vent port 201, which is on the right. Fuel flows from the inlet port 104 to a central chamber 202 of the inlet/vent head 101, said central chamber 202 being continuous between the upper and lower portions 102 and 103, respectively. A lower portion of the central chamber 202 of the bottom portion 103 is equipped with internal threads 203 that are threadably coupled to the top end of the connector pipe 107. The vent port 201 is in communication with an annular chamber 204 that surrounds the central chamber 202 and that exits into the fuel tank through six, equally-spaced cylindrical apertures (see item 604 of FIG. 6—and also of FIG. 2, which identify two such cylindrical apertures in each drawing figure) located within the threaded neck 105 of the bottom portion 103.

Figure 3:
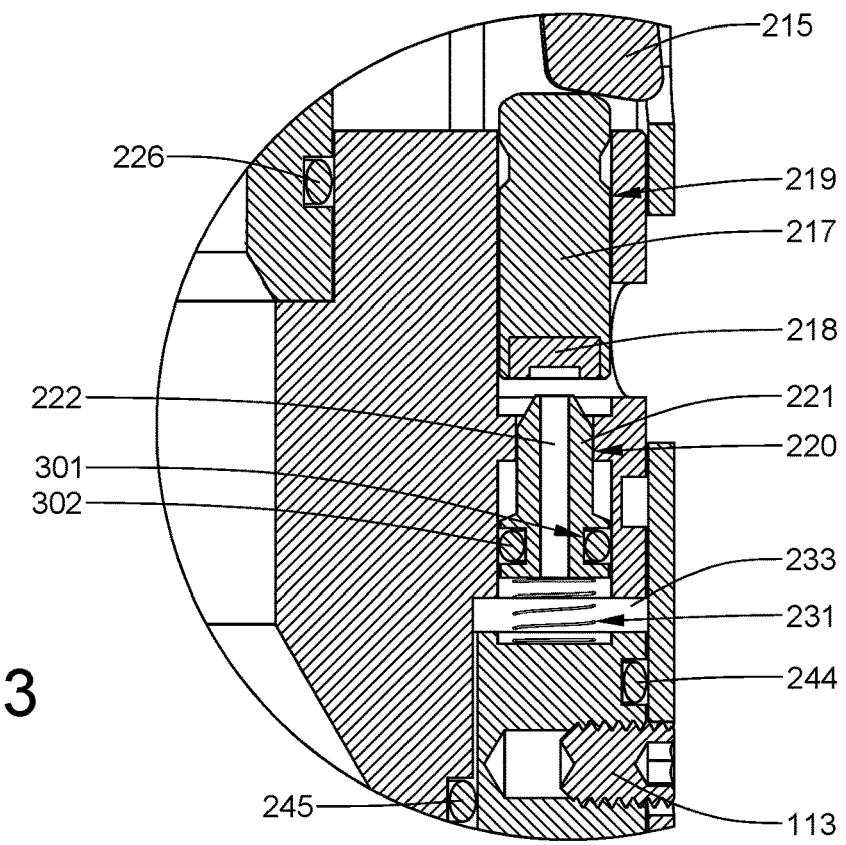
FIG. 3 is a view of the encircled area 3 of FIG. 2, with 4× magnification.

Referring now to FIGS. 2 and 3, the bottom end of the connector pipe 107 screws into an internally-threaded socket 205 in the top cap 108 of the control valve unit 106. The top cap 108 also has a bottom recess 206 into which slides a generally cylindrical hollow float guide 207. A neoprene rubber O-ring seal 208 installed within an O-ring groove 209 in the bottom recess 206 prevents fuel leakage out of the bottom recess 206. The float 111, which surrounds the float guide 207, and which slides up and down on the float guide 207 in response to changing fuel levels in the fuel tank, has a lever arm engagement pin 210 that is immovably secured thereto and that extends from the bottom thereof. The bottom end of the lever arm engagement pin 210 has a bottom end that is reminiscent of an hour glass in that it has a narrow neck 211 and upper and lower stops 212 and 213, respectively. A bleed path control assembly 214 incorporates a lever arm 215 that pivots about a stationary axle 216, and is both coupled to the neck lever arm engagement pin and operative on a vertically-slidable control pin 217, having a seal 218 on a bottom end thereof, which slides within a cylindrical control pin bore 219 in the bleed path control assembly 214. The bleed path control assembly 214 also has a bleed pin bore 220 that is below and concentric with the control pin bore 219. A generally cylindrical, upwardly-biased bleed pin 221, that has a hollow central core 222, slides within the bleed pin bore 220. It will also be noted that the main body 223 of the bleed path control assembly 214 has an upward-facing recess 224 that receives the lower end of the float guide 207. The lower end of the float guide 207 has an annular groove 225 and an O-ring seal 226 that prevent fuel leakage at the joint.

Still referring to FIGS. 2 and 3, a cylindrical float cage 227, having an internally threaded upper end 228, slides over the bleed path control assembly 214, over the float 111, and screws onto the external threads 229 of the top cap 108 of the control valve unit 106. A bleed pin spring retainer 230, which retains a bleed pin coil spring 231 that upwardly biases the bleed pin 221, also slides into the bottom end of the float cage 227 and is secured therein with five set screws 113 (only one such set screw is seen in this view). The bleed pin spring retainer 230 also incorporates an upper vertical bleed passage 232 that is coupled to the bleed pin spring chamber 233 and the bleed pin bore 220 via an upper annular gap 234 between the bottom of the bleed path control assembly 214 and the top of the bleed pin spring retainer 230.

Figure 4:
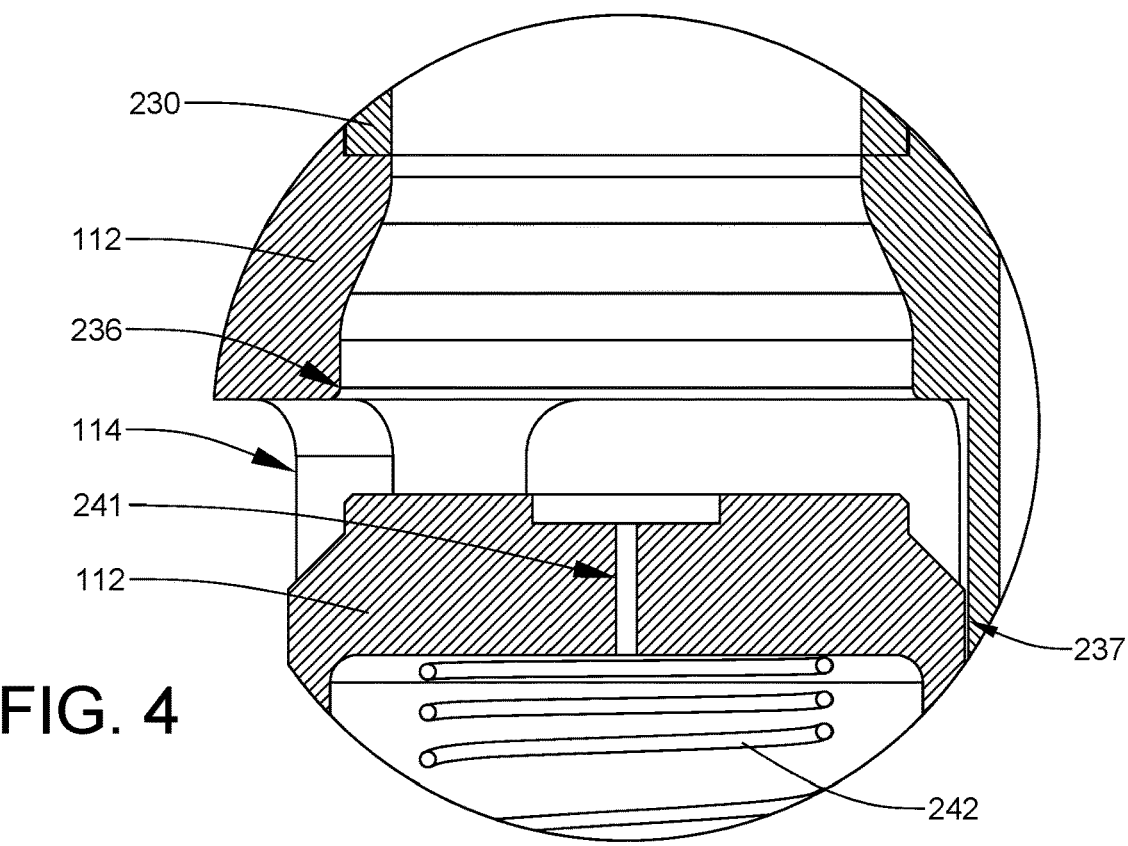
FIG. 4 is a view of the encircled area 4 of FIG. 2, with 4× magnification.

Referring now to FIGS. 2 and 4, a bottom end of the bleed pin spring retainer 230 is equipped with external threads 235, which are threadably coupled to a main valve control unit 112 that incorporates a valve seat 236, a cylindrical bore 237 for a slidable main valve plunger 115 that can engage the valve seat 236 to cut off flow through the flow-control module 100. The main valve plunger 115, which has a small central bleed aperture 238, is inserted into the cylindrical bore 237 followed by a main coil biasing spring 239. The bottom plug 116, which is threadably coupled to main valve control unit 112, retains the main biasing spring 239 and the main valve plunger 115 in the cylindrical bore 237.

Still referring to FIGS. 2 and 4, the bleed path, which controls the open and closed state of the valve plunger 115, begins with the small central bleed aperture 238 in the main valve plunger 115. Once inside the main coil biasing spring chamber 240, bleed fuel flows through a castellated wall 241 in the bottom plug 116 and enters an annular chamber 242 that is adjacent the castellated wall 241. The annular chamber 242 is in communication a lower vertical fuel bleed passage 243 in the main valve control unit 112 that is coupled to the upper vertical bleed passage 232 via a lower annular gap 244 between the bleed pin spring retainer 230 and the main valve control unit 112.

Referring now to FIG. 2, a number of additional O-ring seals are used in the flow-control module 100. O-ring seal 245 is used to seal the joint between the float cage 227 and the main body 223 of the bleed path control assembly 214; O-ring seal 246 is used to seal the joint between the float cage 227 and the bleed pin spring retainer 230; O-ring seal 247 is used to seal the joint between the bleed pin spring retainer 230 and the main body 223 of the bleed path control assembly 214; O-ring seals 248 and 249 are used to seal joints between the bleed pin spring retainer 230 and the main valve control unit 112; O-ring seal 210 is used to seal the main valve plunger 115 and the cylindrical bore 237 in which the plunger 115 slides; and O-ring seal 251 is used to seal the bottom plug 116 within the main valve control unit 112.

Referring now to FIGS. 2, 3 and 4, when fuel is flowing into the inlet port 104 under pressure, passing through the connector pipe 107 into the float guide 207, through the bleed path control assembly 214, past the valve seat 236, and escaping into the fuel tank, the main valve plunger 115 remains in a lowered position as long as the bleed path that begins with the central bleed aperture 240 in the main valve plunger 115 remains open and allows fuel to pass through the bleed pin 221 and out into the fuel tank. However, when the fuel level lifts the float 111, it also lifts the end of the lever arm 215, thereby depressing the vertically-slidable control pin 217, sealing the cylindrical central bore 222 within the bleed pin 221, and thereby cutting off the fuel bleed path. With the bleed path sealed, the main biasing spring 239 plus the added fuel pressure in the chamber below the main valve plunger 115 then have sufficient force to lift the main valve plunger 115 so that it engages the valve seat 236, thereby cutting off the entry of fuel into the fuel tank.

Figure 5:
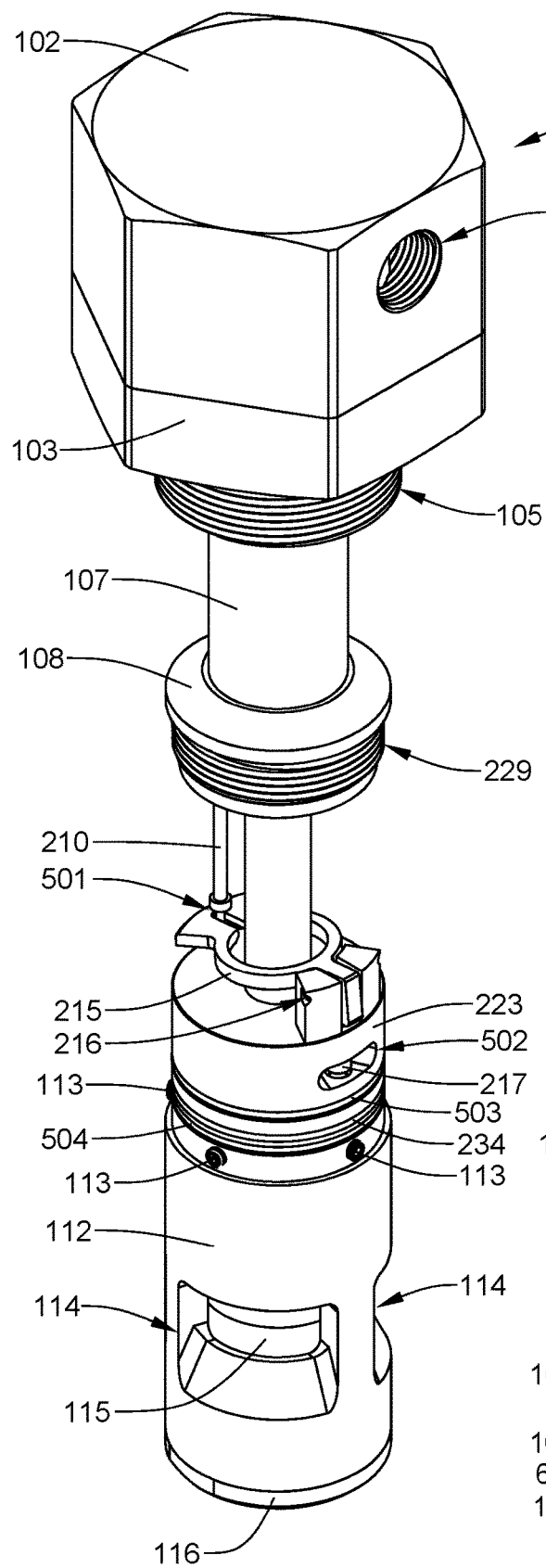
FIG. 5 is an isometric view of the fully-integrated fluid flow control module for top-filled tanks in a valve-open configuration, with the float and float cage removed to show details of the control linkage that controls fluid flow through the bleed path.

Referring now to FIG. 5, the float 111 and float cage 227 have been removed in order to better show the structure of both the bleed path control assembly 214 and its pivotable component, the lever arm 215, which translates vertical movement of the float 111 into the vertical position of the vertically-slidable control pin 217, which controls flow of fuel through the bleed path. It will be noted that there is a gap 501 between the lever arm 215 and the upper stop 212 of the lever arm engagement pin 210. The gap results in hysteresis between turn-on and turn-off times of the main valve, which comprises the main valve plunger 115 and the valve seat 236. The greater the hysteresis, the less the wear on the valve plunger 115 and the valve seat 236. The time between turn-on and turn-off is also dependent on the size of the fuel tank and the fuel consumption rate of the engine being fed by the fuel tank. An hour between turn-on and turn-off times when the engine is running at full power is deemed to be a preferred minimum amount of time. A replacement lever arm engagement pin 210 having a larger gap will result in increased times between turn-on and turn-off of the main valve. It will be noted that the final bleed aperture 502, through which fuel from the hollow bleed pin 221 escapes the bleed path control assembly 214 before entering the fuel tank through apertures 110 in the cylindrical float cage 227, is clearly visible in this drawing figure.

Figure 6:
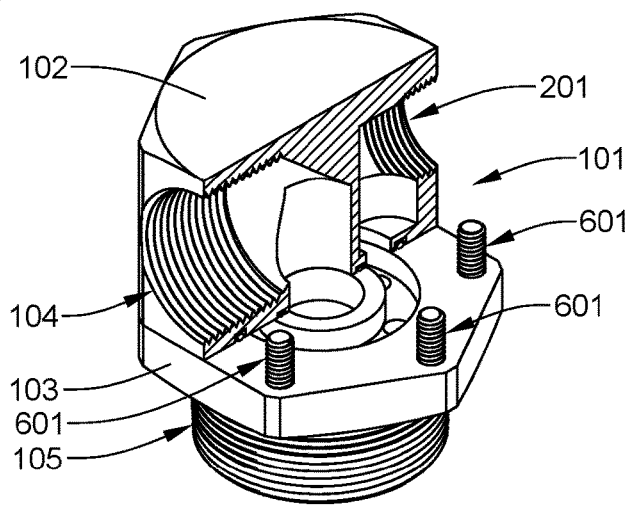
FIG. 6 is a partially-cutaway isometric view of the head, or exterior portion, of the fully-integrated fluid flow control module for top-filled tanks, showing the inlet port, the vent port and two-piece construction thereof.
Figure 7:
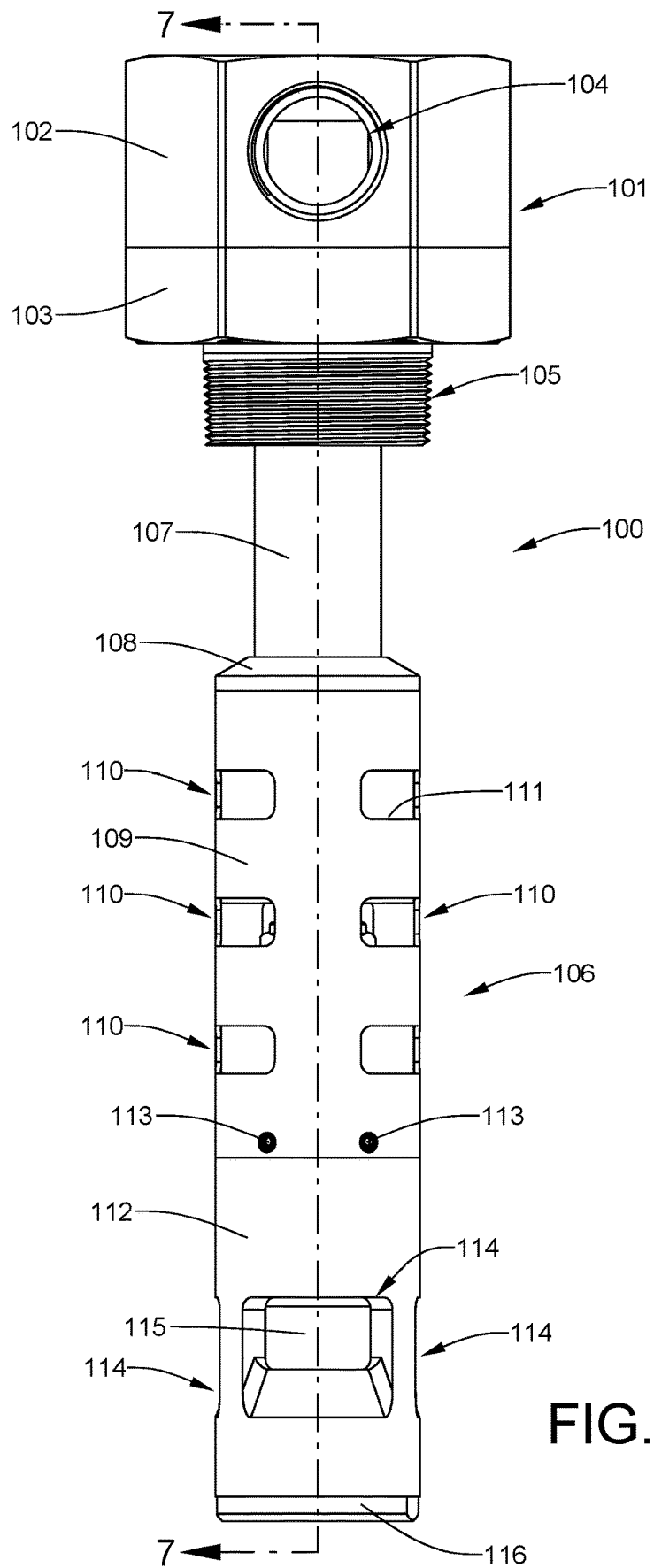
FIG. 7 is an elevational view of the fully-integrated fluid flow control module for top-filled fuel tanks in a valve-closed configuration, and taken from the fluid inlet side thereof.
Figure 8:
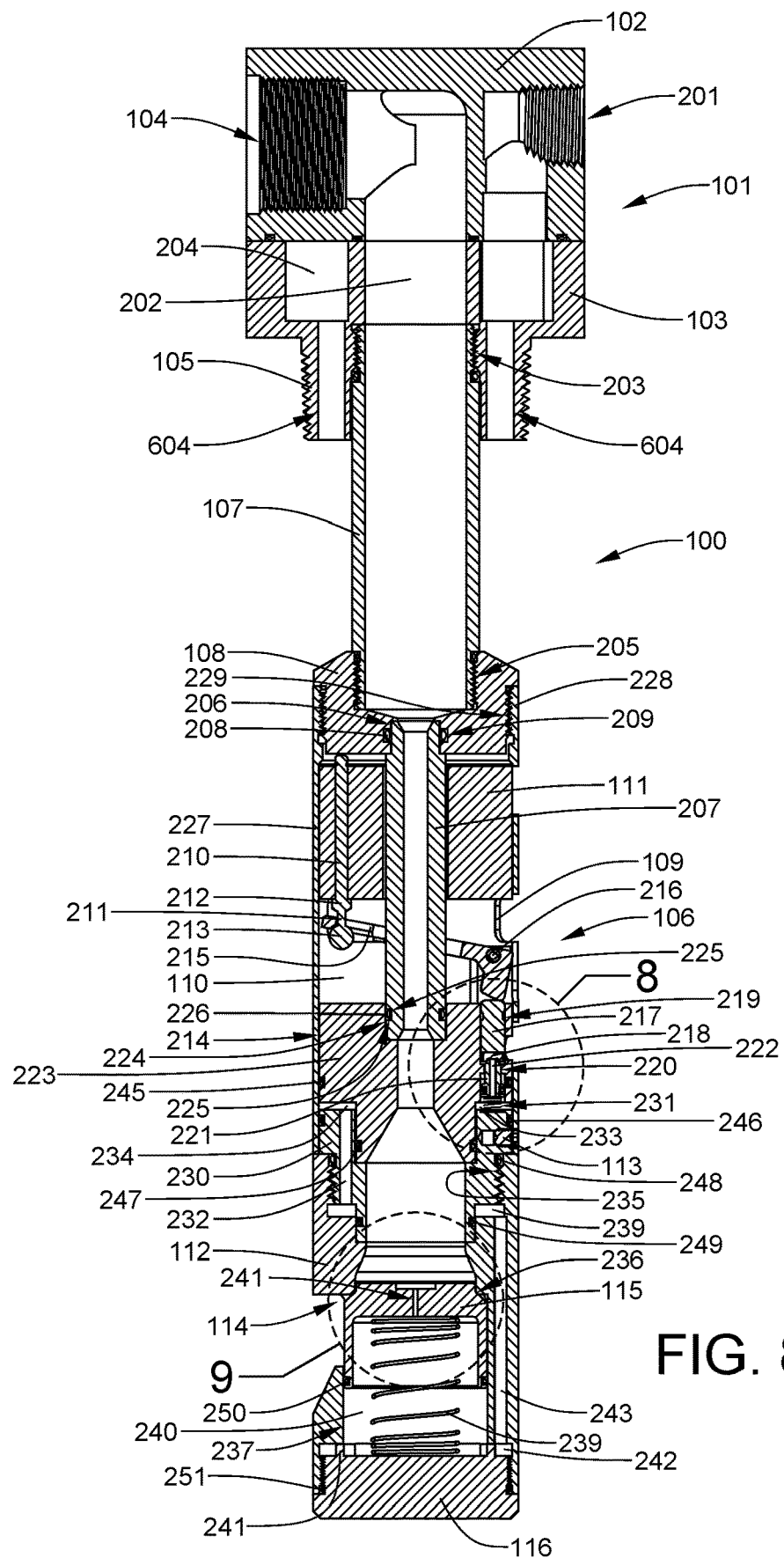
FIG. 8 is a cross-sectional view of the fully-integrated fluid flow control module for top-filled tanks, taken through the section line 8-8 of FIG. 7.
Figure 9:
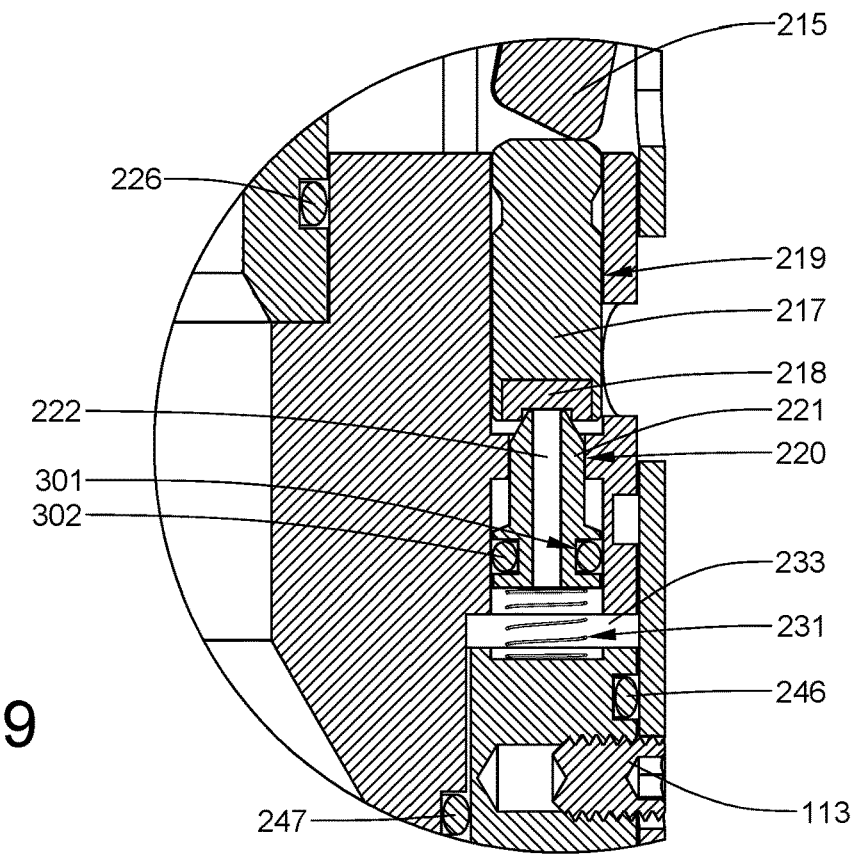
FIG. 9 is a view of the encircled area 9 of FIG. 8, with 4× magnification.
Figure 10:
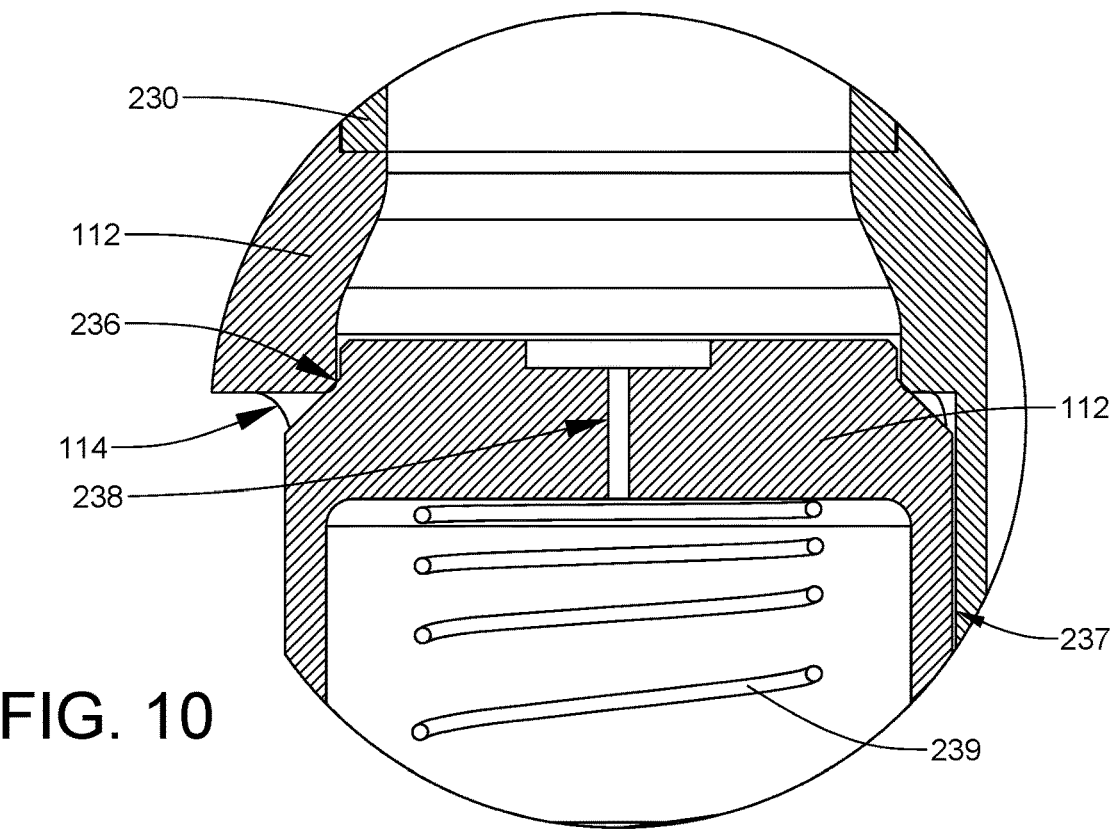
FIG. 10 is a view of the encircled area 10 of FIG. 8, with 4× magnification.
Figure 11:
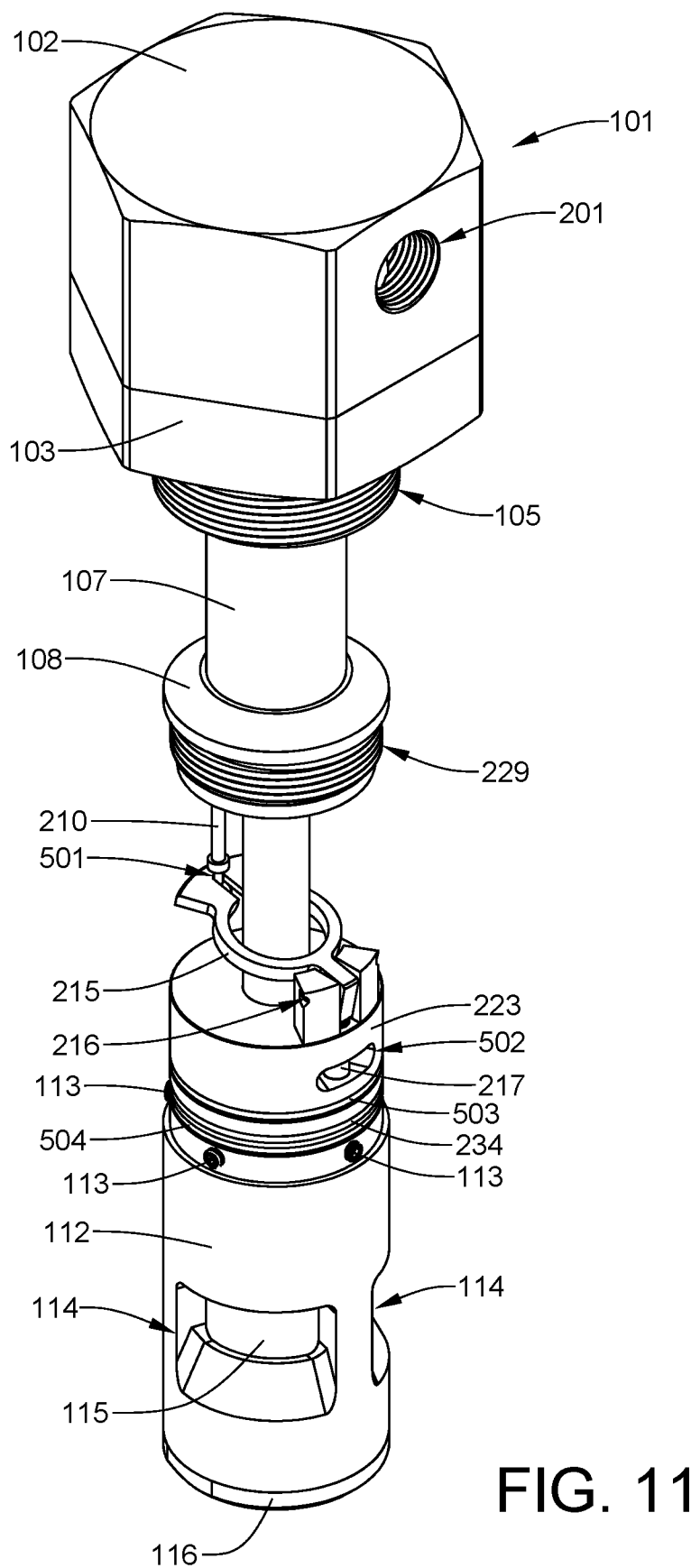
FIG. 11 is an isometric view of the fully-integrated fluid flow control module for top-filled tanks in a valve-closed configuration, with the float and float cage removed to show details of the control linkage that controls fluid flow through the bleed path.

Referring now to FIG. 6, the inlet/vent head 101 is shown in a partial cross-sectional view, which exposes three of the six allen-head bolts 601 that secure the bottom portion 103 of the inlet/vent head 101 to the top portion 102. It will be noted that a pair of O-ring seals 602 and 603 are employed to prevent fuel leads through the machined surface matings of the bottom and lower portions, 103 and 102, respectively.

FIGS. 7, 8, 9, 10 and 11 correspond to FIGS. 1, 2, 3, 4 and 5, respectively. The difference between the larger numbered drawings (i.e., 7, 8, 9, 10 and 11) and the smaller numbered ones is that the smaller numbered drawings show the float 111 in a lowered position, with the vertically-slidable control pin 217 in an elevated position so that the bleed path through the hollow bleed pin 221 is open, the main valve plunger 115 is in a lowered position, and the fuel path from the fuel inlet 104 into the fuel tank open, while the larger number drawings show the float 111 in a raised position, with the vertically-slidable control pin 217 in a lowered position so that the bleed path through the hollow bleed pin 221 is closed, the main valve plunger 115 is in a raised position, and the fuel path from the fuel inlet 104 into the fuel tank is closed.

Although only a single embodiment of the invention is shown and described herein, it will be obvious to those having ordinary skill in the art that changes and modifications may be made thereto without departing from the scope and the spirit of the invention as hereinafter claimed.

What is claimed is:

1. A fully-integrated, flow-control module for a top-fill fuel tank that is supplied by fuel under constant pressure comprising:
    an inlet/vent head having a fuel inlet that receives the fuel under constant pressure and a vent port that maintains atmospheric pressure in the top-fill fuel tank;
    a main valve control unit, in communication with the fuel inlet, that shuts off fuel flow into the top-fill fuel tank when the top-fill fuel tank is full, and automatically opens and allows fuel to enter the top-fill fuel tank when a fuel level drops a certain amount below a full level, said main valve control unit having a valve seat, a valve plunger having a bleed aperture, said valve plunger being upwardly biased by a biasing spring, said bleed aperture diverting a small amount of incoming fuel to a bleed path that empties into the top-fill fuel tank when the top-fill fuel tank is not full;
    a vertically-slidable control pin that is upwardly positionable to open the bleed path and downwardly positionable to close the bleed path;
    a lever arm, operative on the vertically-slidable control pin, pivotal movement of which controls a vertical position of the vertically-slidable control pin;
    a lever arm engagement pin that is secured to the fuel level float, said lever arm engagement pin having an upper stop and a lower stop; and
    a fuel level float, operative on the lever arm, to cause pivotal movement thereof;
    wherein the lever arm is coupled to the lever arm engagement pin between the upper and lower stops;
    wherein a distance between the upper and lower stops determines a period between opening and sealing of the bleed path; and
    wherein when the top-fill fuel tank becomes full, the fuel level float rises, thereby causing the lever arm to pivot and depress the vertically-slidable control pin, which seals the bleed path, thereby increasing pressure beneath the valve plunger an amount sufficient to cause the biasing spring to slide the valve plunger upwardly to engage the valve seat, thereby stopping the entry of fuel into the top-fill fuel tank.

2. The fully-integrated, flow-control module for a top-fill fuel tank of claim 1, wherein a period of about one hour between opening and sealing of the bleed path is deemed to be a preferred minimum amount of time when fuel from the top-fill fuel tank is being fed to equipment powered by an internal combustion engine operating at about full power.

3. The fully-integrated, flow-control module for a top-fill fuel tank of claim 1, wherein said lever arm is pivotally secured to a float cage directly above the vertically-slidable control pin.

4. A fully-integrated, flow-control module for a top-fill fuel tank that is supplied by fuel under constant pressure comprising:
    an inlet/vent head having a fuel inlet that receives the fuel under constant pressure and a vent port that maintains atmospheric pressure in the top-fill fuel tank;
    a float cage coupled to the inlet/vent head;
    a float installed within the float cage that tracks fuel level in the top-fill fuel tank;
    a control valve unit coupled to the float cage, said control valve unit incorporating a vertically-slidable control pin that in a raised position, maintains a bleed path open, and in a lower position, seals the bleed path;
    a lever arm coupled to the float and operative on the vertically-slidable control pin such that the lever arm lowers the control pin when the float senses a fuel-tank-full condition and the lever arm releases the control pin when the float senses a fuel-tank-not-full condition;
    a lever arm engagement pin that is secured to the float, said lever arm engagement pin having an upper stop and a lower stop; and
    a main valve control unit, coupled to the inlet/vent head, and in communication with the fuel inlet, said main valve control unit having a valve seat, a valve plunger having a bleed aperture, said valve plunger being upwardly biased by a biasing spring, said bleed aperture diverting a small amount of incoming fuel to the bleed path that empties into the top-fill fuel tank when the top-fill fuel tank is not full;
    wherein the lever arm is coupled to the lever arm engagement pin between the upper and lower stops;
    wherein a distance between the upper and lower stops determines a period between opening and sealing of the bleed path; and
    wherein when the top-fill fuel tank becomes full, the float rises, thereby causing the lever arm to pivot and depress the vertically-slidable control pin, which seals the bleed path, thereby increasing pressure beneath the valve plunger an amount sufficient to cause the biasing spring to slide the valve plunger upwardly to engage the valve seat, thereby stopping an entry of fuel into the top-fill fuel tank.

5. The fully-integrated, flow-control module for a top-fill fuel tank of claim 4, wherein a period of about one hour between opening and sealing of the bleed path is deemed to be a preferred minimum amount of time when fuel from the top-fill fuel tank is being fed to equipment powered by an internal combustion engine operating at about full power.

6. The fully-integrated, flow-control module for a top-fill fuel tank of claim 4, wherein said lever arm is pivotally secured to the float cage directly above the vertically-slidable control pin.

7. A fully-integrated, flow-control module for a top-fill fuel tank that is supplied by fuel under constant pressure comprising:
- an inlet/vent head having a fuel inlet that receives the fuel under constant pressure and a vent port that maintains atmospheric pressure in the top-fill fuel tank;
- a float cage coupled to the inlet/vent head;
- a float installed within the float cage that tracks fuel level in the top-fill fuel tank;
- a lever arm engagement pin that is secured to the float, said lever arm engagement pin having an upper stop and a lower stop;
- a control valve unit rigidly secured to the float cage, said control valve unit incorporating a vertically-slidable control pin that in a raised position, maintains a bleed path open, and in a lower position, seals the bleed path;
- a lever arm coupled to the lever arm engagement pin between the upper and lower stops, said lever arm operative on the control pin such that it depresses the vertically-slidable control pin and seals the bleed path when the float senses a fuel-tank-full condition and releases the vertically-slidable control pin when the float senses a fuel-tank-not-full condition; and
- a main valve control unit, coupled to the inlet/vent head, and in communication with the fuel inlet, said main valve control unit having a valve seat, a valve plunger having a bleed aperture, said valve plunger being upwardly biased by a biasing spring, said bleed aperture diverting a small amount of incoming fuel to the bleed path that empties into the top-fill fuel tank when the top-fill fuel tank is not full;
- wherein, when the top-fill fuel tank becomes full, the fuel rises, thereby causing the lever arm to pivot and depress the vertically-slidable control pin, which seals the bleed path, thereby increasing pressure beneath the valve plunger an amount sufficient to cause the biasing spring to slide the valve plunger upwardly to engage the valve seat, thereby stopping an entry of fuel into the top-fill fuel tank.

8. The fully-integrated, flow-control module for a top-fill fuel tank of claim 7, wherein said lever arm is pivotally secured to the float cage directly above the vertically-slidable control pin.

9. The fully-integrated, flow-control module for a top-fill fuel tank of claim 7, wherein a distance between the upper and lower stops determines a period between opening and sealing of the bleed path.

10. The fully-integrated, flow-control module for a top-fill fuel tank of claim 9, wherein a period of about one hour between opening and sealing of the bleed path is deemed to be a preferred minimum amount of time when fuel from the top-fill fuel tank is being fed to equipment powered by an internal combustion engine operating at about full power.

* * * * *